Sept. 15, 1925.  1,553,900
W. HUHND
MACHINE FOR THE MANUFACTURE OF STRIPS OF MATCHES FOR BOOK MATCHES
MADE OF WOOD, CARDBOARD, AND THE LIKE
Filed July 3, 1925   6 Sheets-Sheet 1
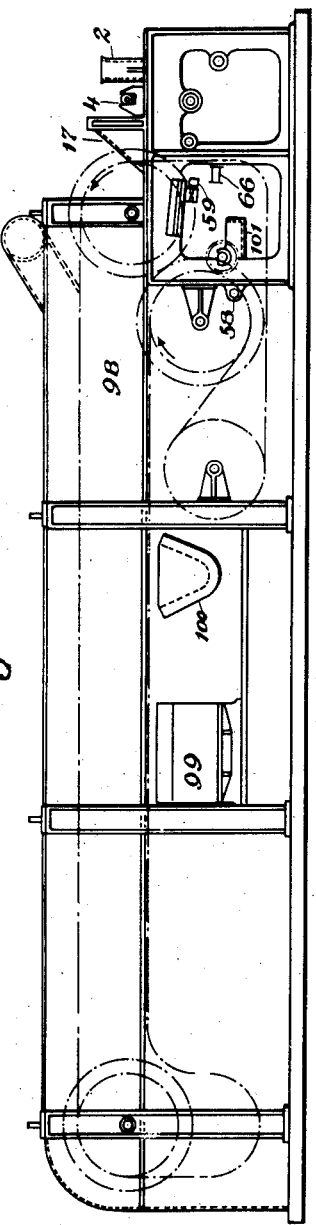
INVENTOR
Wilhelm Huhnd
BY
ATTORNEYS

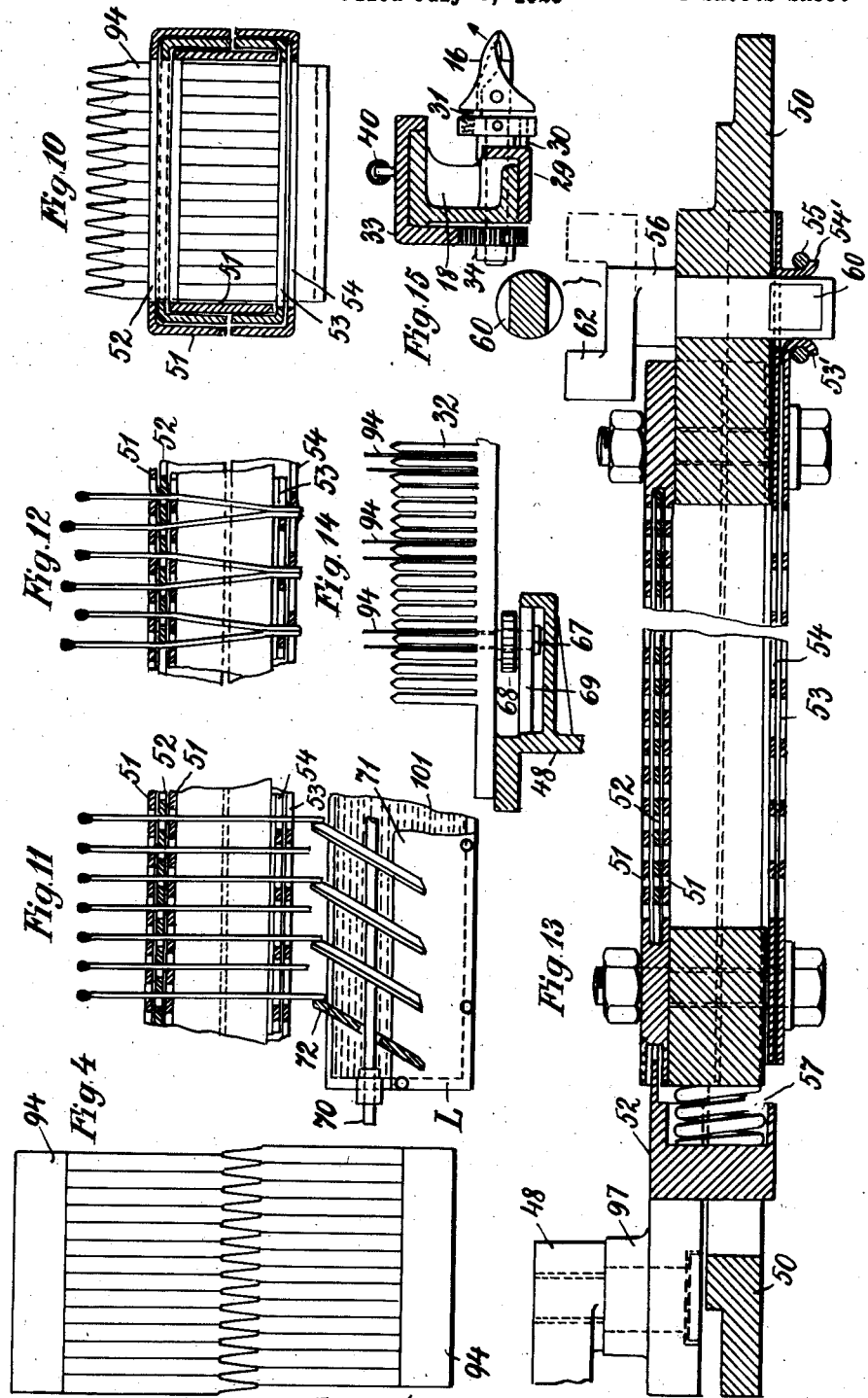

Sept. 15, 1925.  
W. HUHND  
1,553,900  
MACHINE FOR THE MANUFACTURE OF STRIPS OF MATCHES FOR BOOK MATCHES  
MADE OF WOOD, CARDBOARD, AND THE LIKE  
Filed July 3, 1925   6 Sheets-Sheet 3

Inventor  
Wilhelm Huhnd  
By  
Attorneys

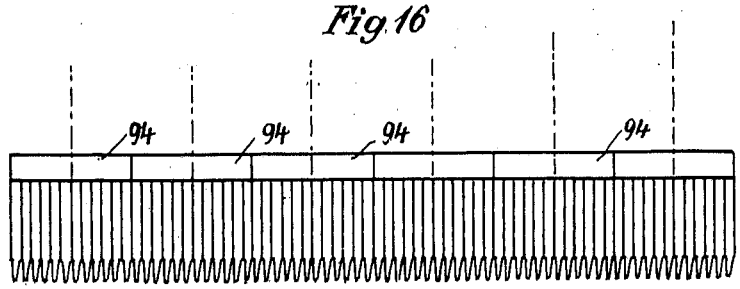
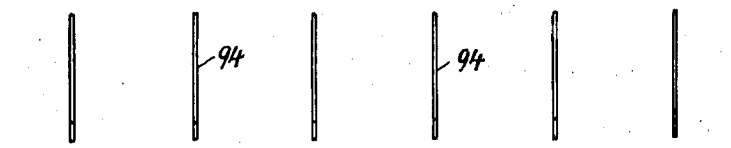
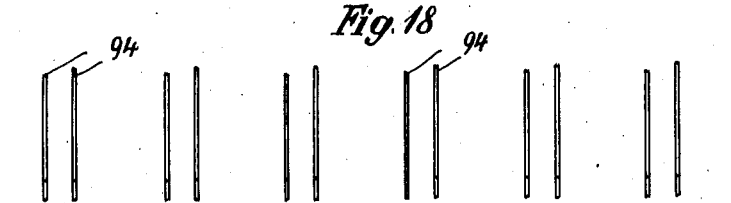
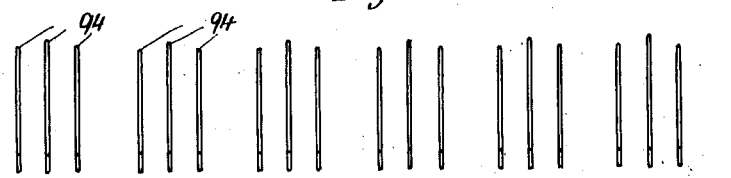
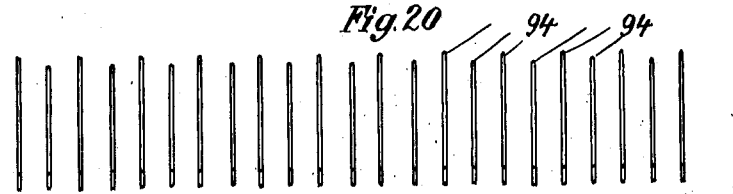

Sept. 15, 1925. 1,553,900
W. HUHND
MACHINE FOR THE MANUFACTURE OF STRIPS OF MATCHES FOR BOOK MATCHES
MADE OF WOOD, CARDBOARD, AND THE LIKE
Filed July 3, 1925 6 Sheets-Sheet 5
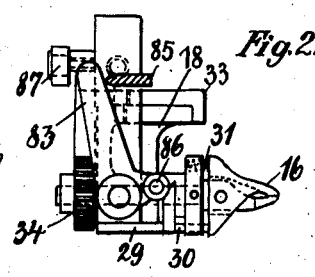
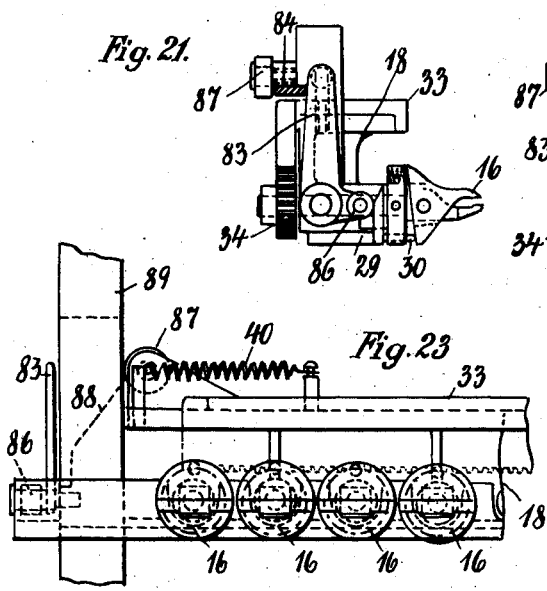
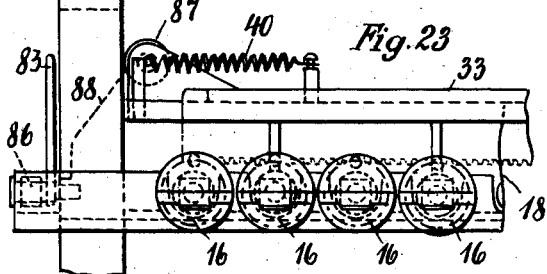
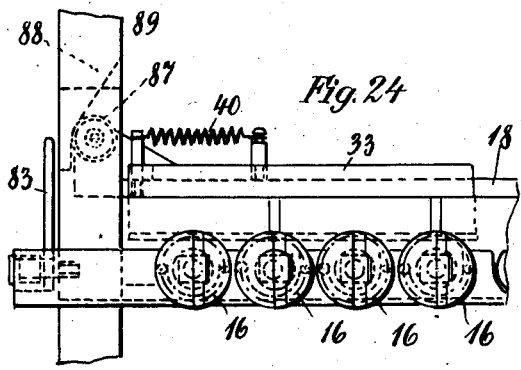
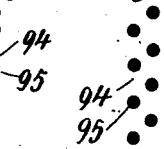
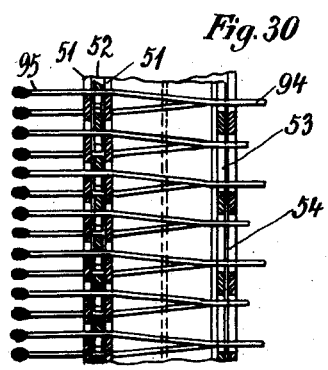
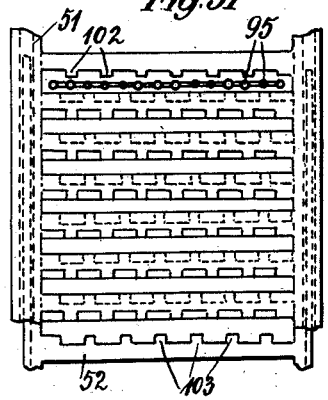
Inventor
Wilhelm Huhnd
By
Attorneys Sept. 15, 1925. 1,553,900
W. HUHND
MACHINE FOR THE MANUFACTURE OF STRIPS OF MATCHES FOR BOOK MATCHES
MADE OF WOOD, CARDBOARD, AND THE LIKE
Filed July 3, 1925 6 Sheets-Sheet 6
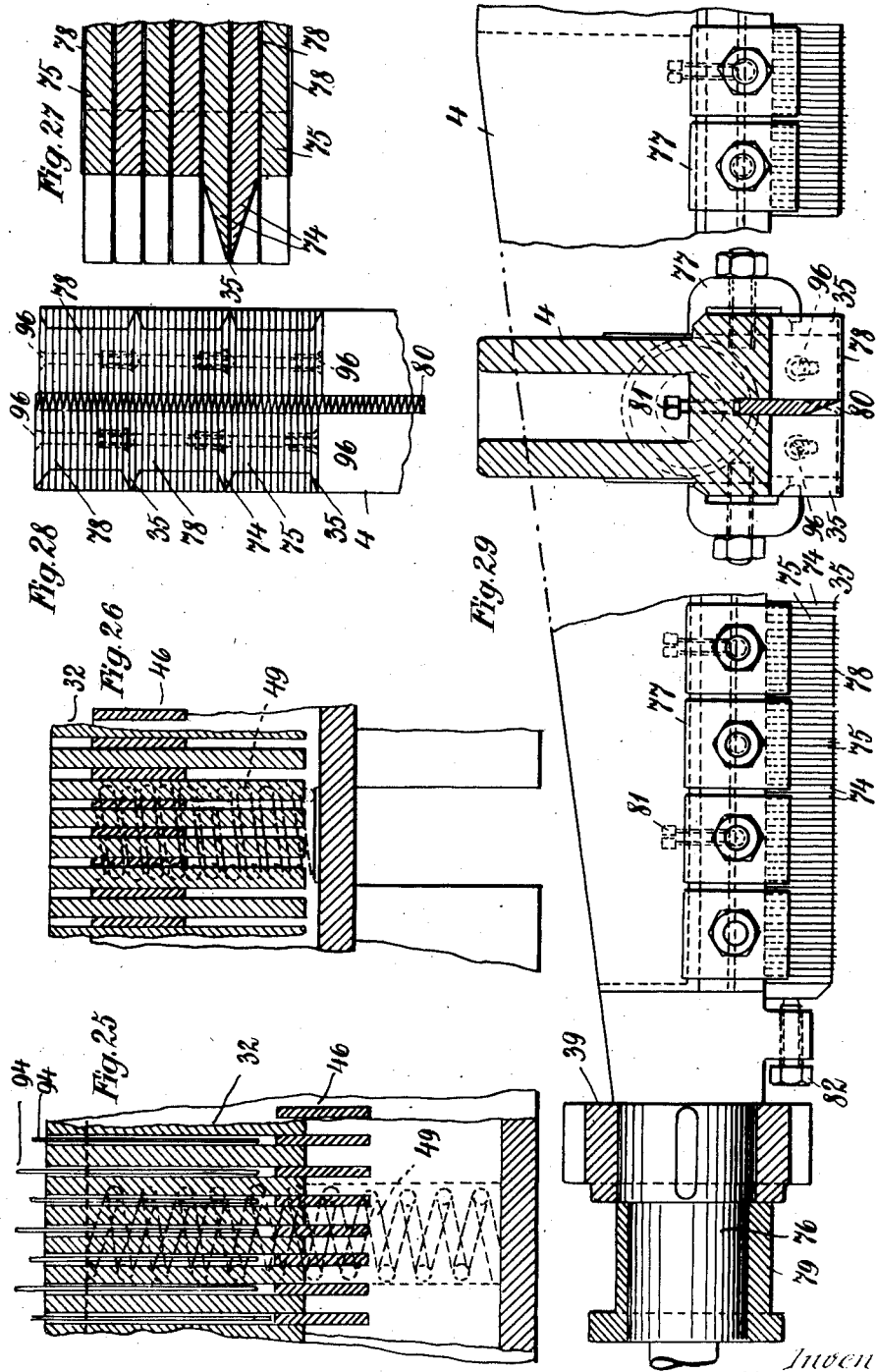

Patented Sept. 15, 1925.

1,553,900

UNITED STATES PATENT OFFICE.

WILHELM HUHND, OF BERLIN, GERMANY, ASSIGNOR TO THE FIRM A. ROLLER, MASCHINENFABRIK, OF BERLIN, GERMANY.

MACHINE FOR THE MANUFACTURE OF STRIPS OF MATCHES FOR BOOK MATCHES MADE OF WOOD, CARDBOARD, AND THE LIKE.

Application filed July 3, 1925. Serial No. 41,328.

*To all whom it may concern:*

Be it known that I, WILHELM HUHND, a citizen of the German Empire, residing at Putbuserstrasse 45, Berlin N. 31, Germany, have invented certain new and useful Improvements in a Machine for the Manufacture of Strips of Matches for Book Matches Made of Wood, Cardboard, and the like (for which I have filed application in Germany, May 7, 1924); and I do hereby declare the following to be a full, clear, and exact description of the invention.

This invention relates to a machine for the automatic manufacture of strips of matches made of wood, cardboard or the like, which can be united to form the known book matches. Hitherto the strips of matches used for book matches could only be manufactured by separate working processes, in which moreover waste always occurred by stamping the pointed tips out of the piece of material. This waste is completely obviated by the machine according to the invention and the manufacture of the strips of matches is effected automatically in a single continuous working process so that there is a material saving in labour and time.

The working process consists essentially in the fact that a blank of wood, cardboard or the like corresponding to the breadth of a number of strips of matches is first cut up longitudinally and transversely by depressing a cutter block or knife head in such a way that the longitudinal cuts separating the individual match sticks from one another are displaced relatively to one another by half the breadth of one stick and the cut forming the tips runs zigzag from one longitudinal cut to the next, so that the cut-out sticks interengage with one another with their tips. At the same time the individual strips of matches are separated from one another breadthwise. The strips of matches of one half of the blank are then seized by an equal number of grippers, rotated through 90° and located edgewise in a collecting comb. Meanwhile the knife head to which the second half of the blank still clings between the knives has been rotated through 180° with this half of the blank, whereupon the correspondingly raised grippers seize the strips of matches of the second half of the blank and lodge them after rotating them through 90° in the collecting comb, which has meanwhile been shifted laterally one division, so that the strips of matches of both halves are located side by side on edge in the collecting comb. Meanwhile a fresh strip is brought under the knife head and is cut up in the same manner into two strips of matches, which in turn are deposited beside the strips of matches already placed in the collecting comb. This process is repeated until the whole of the collecting comb is filled with strips of matches standing on edge side by side. The collecting comb is then pushed forward against an endless chain, which is provided with carrying ledges corresponding to the collecting comb. Into one of these carrying ledges the strips of matches are pushed from the collecting comb and are clamped in the carrying ledge, whereupon they are conveyed by the continuously moving carrying ledge chain, one after the other, to the paraffining apparatus, the dipping apparatus and so forth, and are finally stuck together in pairs by the ends opposite to the heads, whereupon they are deposited on a band conveyor.

One constructional example of such a machine is diagrammatically illustrated in longitudinal section in Figure 1.

Figures 2 and 3 show the blank to be worked up, before and after being cut up into separate sticks.

Figure 4 shows on a larger scale two strips cut out of the blank.

Figure 5 shows a finished strip of matches, and

Figure 6 a pair of finished strips glued together.

Figure 7:
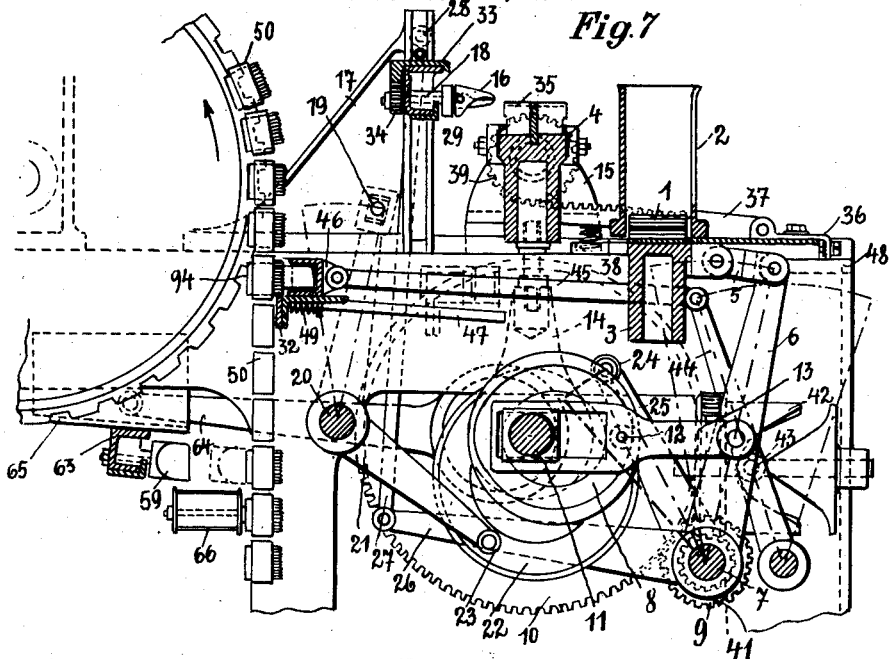
Figure 8:
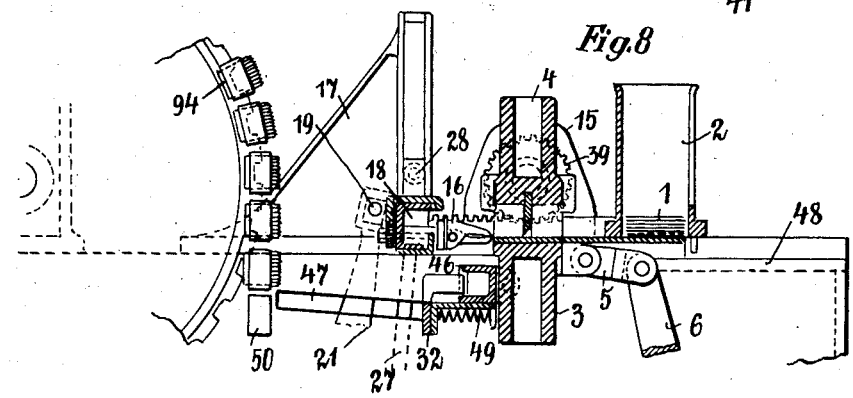
Figure 9:
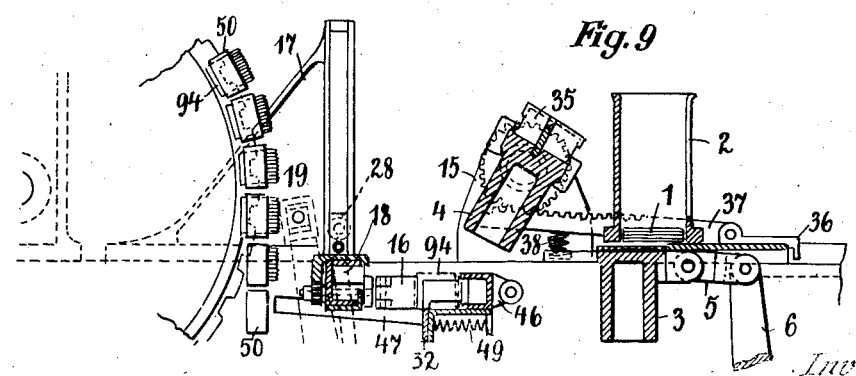

Figures 7 to 9 show in sectional elevation the apparatus for cutting up the blank and for laying the strips in the collecting comb, as well as for pushing the strips into the carrying-ledge chain.

Figure 10 shows a cross section through a carrying ledge.

Figures 11, 12 and 13 are longitudinal sections through a carrying ledge, showing different positions of the slider that clamps the strips.

Figure 14 shows the collecting comb in front elevation.

Figure 15 shows one of the grippers for lodging the strips in the collecting comb.

Figure 16 shows one of the half blanks with the strips after cutting up.

Figures 17 to 20 show diagrammatically the method of inserting the strips in the collecting comb.

Figures 21 and 22 show in side elevation the apparatus for opening and closing the grippers.

Figures 23 and 24 show this apparatus in front elevation in two different positions.

Figures 25 and 26 show in horizontal longitudinal section in two different positions the apparatus for pushing the strips into a carrying ledge.

Figure 27 shows on a larger scale a horizontal section through the knives.

Figure 28 is a view thereof from below.

Figure 29 shows the knife beam in front elevation and in sectional elevation.

Figures 30 and 31 show in longitudinal section and in front elevation respectively a special constructional form of a carrying ledge.

Figures 32 and 33 show diagrammatically the position of the match heads before and after the displacement of the clamping rail of the carrying ledge illustrated in Figures 30 and 31.

The blanks 1 (Fig. 2) intended for the manufacture of the match sticks, which may consist for example of wood, are partly cut through during their manufacture at a certain distance from the edges by two parallel cuts 90 which are intended to facilitate the breaking off of the match sticks. The blanks are then cut up into lengths of one metre for example corresponding to the breadth of the machine, and then laid in the receptacle 2 (Figs. 7 to 9) under which the stick-pusher 3 is arranged. The latter is provided in a known manner with a forwardly projecting edge, which, when the stick-pusher is pushed forwards, takes with it the lowermost stick and pushes it under the knife-carrier 4.

With the stick-pusher 3 there engages, by means of a link 5, a lever 6 secured to a shaft 7, which is driven by a connecting rod 13, having a roller 12 which bears against a cam disc 8 secured to a shaft 11. The shaft 11 receives its drive by means of gear wheels 9 and 10.

The knife head 4 is provided with a longitudinal knife or cutter 80 (Figs. 28 and 29) the edge of which is of zigzag shape so that it forms the central zigzag-shaped longitudinal cut 93 (Figure 3). For cutting up the blank into separate strips of matches 94 (Figs. 5 and 16) there serve the knives 35 (Figs. 27, 28 and 29) which make the cuts 91 (Figure 3) and are held by intermediate plates 74. Between these knives there are shorter knives 78, which make the cut 92 running from the zigzag-shaped central cut 93 to the partial cuts 90, the individual match sticks 95 being formed by the said cuts 92. These knives 78 are held by the intermediate plates 75 at a predetermined distance from one another. The knives 78 are held together with the intermediate plates 74 and 75 by screws 96 in groups which, as a whole, may be located between the separating knives 35. The knives pass only so far downwards out of the intermediate plates as is necessary for cutting through the thin blank. It is therefore possible to utilize such thin knives that it becomes superfluous to sharpen them. By means of claws 77 (Fig. 29) the groups of knives are secured to the knife-carrier 4 and by means of screws 82 are adjusted in the longitudinal direction to the central zigzag knife 80. In order to be able to regulate the depth of cut easily an eccentric bush 79 is arranged on the pivot of the knife-carrier 4, and furthermore for the zigzag knife the adjusting screws 81.

If the stick-pusher 3 is moved forward out of the position shown in Figure 7 into that shown in Figure 8, it pushes the stick lying on its front prolongation under the knife-carrier 4. The latter is then drawn downwards by an eccentric fitted on to the shaft 11, by means of the connecting rod 14, the knife-carrier being guided between the cheeks 15. By this downward movement of the knife-carrier the blank is cut up into separate strips 94 (Fig. 4), which, however, still adhere to the knives. After the cut is completed the knife head goes back again into its original position.

Meanwhile grippers 16, the number of which corresponds to the number of strips 94, are pushed forward against the strips 94. These grippers are rotatably supported in a gripper-holder 18, which is displaceable in a vertical guide of a guide block 17 which is displaceable in a horizontal direction, so that all the grippers can not only be displaced horizontally but also moved up and down. The horizontal displacement of the gripper-holder is effected by means of a lever 21 rotatable about a bolt 20, the said lever engaging at its upper end with a pin 19 on the guiding block 17 and at its lower end carrying a roller 23, which bears against a grooved disc 22 secured to the shaft 11. The vertical displacement of the gripper-holder 18 is effected, by means of the connecting rod 27, the upper end of which engages on the pin 28 of the gripper-holder, by the bell-crank lever 25, 26 journalled on the shaft 7, the arm 25 of the said bell-crank lever carrying at its outer end a roller 24, which bears against a grooved disc, not definitely shown, secured to the shaft 11. The grippers 16 (Figs. 15 and 21 to 24) have each one stationary and one movable member. The latter is normally pressed by a spring 31 towards the stationary member, so as to close the gripper. The opening of the gripper is effected by means of a bell-crank lever 83 (Figs. 21 and 22) journalled on the gripper-holder, the said bell-crank lever acting with a roller 86 fitted on to its short arm upon the bevelled surface of an angle bar 29 in such a manner that the latter is pushed forward against the grippers. It then pushes a pin 30 against the lower arm of the movable member so that the gripper is opened, as shown in Figure 21. The rocking of the bell-crank lever is effected by striking against stationary stops 84 (Fig. 21) and 85 (Fig. 22).

When the grippers are opened in this manner they are pushed forward against the strips 94 and then closed again, so that they seize the strips that are facing the grippers and hold them fast. The grippers are then moved away from the storage receptacle by displacing the guide block 17, in order to bring the strips seized by the grippers above the teeth of a collecting comb 32.

For this purpose the strips held by the grippers must be transferred out of a horizontal into a vertical position. This is effected by rotating the grippers 16 about their axes. To the rear ends of the axes are fitted toothed wheels 34 which engage with a rack 33 guided upon the gripper-holder 18 and displaceable in its longitudinal direction. This rack is provided at its end with a roller 87 (Figs. 23 and 24) which is drawn by a spring 40 against a lateral guiding rail 89, which is provided with a ramp 88. If the gripper-holder is guided past this ramp the grippers are rotated through 90 degrees in consequence of the displacement of the rack 33, so that the strips 94 seized by the grippers now stand vertically as indicated in Figure 17.

During the further downward movement of the grippers the strips 94 standing vertical are then inserted between the teeth of the collecting comb 32, as illustrated in dotted lines in Figure 9. Shortly before the grippers 16 have reached their lowest position they are opened again by the angle bar 29 moving forward, so that they release the strips 94, whereupon the grippers are pushed vertically upwards again.

Meanwhile the stick-pusher 3 has begun its return stroke in order to take a fresh strip out of the receptacle 2. During this return stroke the cutter head 4 is rotated through 180°, for the stick-pusher 3 is provided with an adjusting piece 36 to which a rack 37 is pivoted, which is kept in engagement by a spring 38 with a toothed wheel 39 secured to the cutter head 4. During the rearward movement of the stick-pusher the cutter head 4 is therefore rotated out of the position illustrated in Figure 8 through that of Figure 9 into that illustrated in Figure 7, so that the knives are now directed upwards. To the cutters there still adhere the strips facing the receptacle 2 during the cutting of the match strips, which now with their outer edges stand facing the grippers 6 which are meanwhile brought into their highest position (Fig. 7).

The grippers 16 are now opened again and pushed forward in order to take off also this second series of strips from the cutter head and place it after rotating it through 90° in the collecting comb 32 which has meanwhile shifted one division in the longitudinal direction. This displacement is effected by means of an eccentric 69 (Fig. 14) connected with the comb, the said eccentric engaging in a corresponding guide in the machine frame 48 and being rotated by a feed mechanism, not shown, which engages at each upward and downward movement of the gripper holder in a feed wheel 68 connected with the eccentric, the extent of the rotation being such that the comb is displaced one division. If this second series of strips is deposited in the collecting combs 32 they lie in the same groups of two sheets each side by side on edge as diagrammatically illustrated in Fig. 18. Upon the next operation of the machine two further series of strips are then deposited in the comb so that the latter exhibits first, groups of three and then groups of four strips lying side by side by which, in the example illustrated, the comb is filled.

In the arrangement of the knives illustrated the zigzag knife 80 does not lie exactly in the centre line but somewhat away from it so that the sticks of one series of strips come out longer than those of the other series. This is for the purpose of producing pairs of strips in which, as illustrated in Fig. 6, the match heads do not lie directly one upon the other, but are displaced relatively to one another in the longitudinal direction of the sticks. The match heads of the strips assembled to form a book, cannot therefore come into contact with one another.

When the collecting comb 32 is filled with strips, the strips must be transferred to the carrying ledges 50 of an endless and continuously moving transporting chain which conveys them to the positions for further treatment. The moving of the collecting comb 32 to the carrying ledges 50 is effected by means of a cam cylinder 42 (Fig. 7) which is set in rotation by a worm 41 mounted on the shaft 7. In the groove of this cam cylinder runs the roller 43 of a lever 44 which is connected at its upper end by a connecting rod 45 with a thrust comb 46 arranged behind the collecting comb 32. This thrust comb, the teeth of which face the gaps between the teeth of the collecting comb, is pressed away from the collecting comb by a compression spring 49 so that the two combs are first fed forward together towards the carrying ledges 50 without their relative position being altered. The collecting comb is thus guided in oblique slots 47 in the machine frame. These guiding slots are oblique because the carrying ledge 50 of the endless transporting chain to be filled moves onward during the insertion of the strips. When the collecting comb 32 has arrived at the end of the guiding slots 47 it is arrested while the thrust comb 46 is moved further on so that its teeth penetrate, owing to the compression of the spring 49 into the interstices of the collecting comb 32 and push out the strips located therein and push them into the corresponding interstices of the carrying ledge 50 (Figs. 25 and 26). The strips 94 are thus pushed into the carrying ledge with their adhering edge in front, while the heads intended for the reception of the ignition mass project out of the carrying ledge towards the outer side facing the storage receptacle 2 and the cutting and conveying apparatus.

For securing the match strips 94 in the carrying ledges 50 the following arrangement is employed. The carrying ledges 50 are provided on the outside with two stationary grid plates 51 located one behind the other, between which is displaceably arranged a movable grid plate 52 (Fig. 13) provided with similar apertures and bars. This latter grid plate is influenced by a spring 57 which tends to shift the sliding grid 52 in such a way that its bars lie opposite to the apertures in the stationary grid plates 51. While, however, the carrying ledge 50 to be filled, lies opposite to the collecting comb 32 and thrust comb 46, a roller 97 supported on the stationary machine frame 48 presses the sliding grid 52 against the action of the spring 57 so far back that its apertures register with those of the stationary grid plates 51, as illustrated in Fig. 13, so that the match strips 94 can be pushed without hindrance out of the collecting comb into the apertures of the carrying ledge. Further along the path of the transporting chain the carrying ledge comes out of contact with the roller 97 so that now the spring 57 comes into action and shifts the sliding grid 52 in such a way that the match strips that have been pushed in are firmly nipped between the sliding grid and the stationary grid plates.

On the opposite side of the carrying ledge 50 are arranged two sliding grids 53 and 54 movable relatively to one another, the apertures of which are so wide that they embrace two associated match strips as illustrated in Fig. 11. These slider grids are influenced by a spring 55 which tends to pull the two sliders against a bolt 56 supported in the carrying ledge, the said bolt being provided on two opposite sides with flattened surfaces 60. If the bolt 56 is rotated through 90° in which its arm 62 is rotated by a stationary stop on the machine frame at the side, the lateral attachments 53¹, 54¹ of the sliders 53 and 54 come to position with the flattened parts 60, wherein the sliders shift relatively to one another, as will be hereinafter explained.

The carrying ledges 50 filled with strips of matches and united to form an endless chain, are then guided, one after the other through a drying chamber 98 (Fig. 1) and to the paraffining apparatus 99 and the dipping apparatus 100, where the strips are treated in a known manner. They then come to the gluing apparatus 101 (Fig. 11) which is provided for each second strip of matches with a transferring disc 72. These discs which dip at the bottom into the glue container L are secured with ball joints to the shaft 70 and are so guided in a guide plate 71 provided with oblique guide slots that with their bevelled edges they pass laterally along in contact with the lower end of the rather long strip of match sticks. This plate 71 serves at the same time to wipe off the excess glue.

In order to be able to glue the strips of matches together in pairs by their rear edges, as illustrated in Fig. 6 the sliding grids 51 and 52 of the carrying ledge 50 must be somewhat opened, and this is effected by the slider 52 coming into contact again with a roller arranged on the machine frame, but not shown, which pushes it back against the action of the spring 57. The strips of matches thus released, then come into contact by their uncut edges with a roller 58 (Fig. 1) arranged behind the gluing apparatus, the said roller displacing the glued edges of the strips of matches so far that these edges lie at the same height as the adjacent unglued edges of the shorter match strips. The sliders 53 and 54 (Fig. 13) located on the inner side of the carrying ledge are then closed, the arm 62 of the bolt 56 coming into contact with the aforementioned stop so that the bolt is rotated through 90° and the attachments 53¹ and 54¹ of the sliders bear against the flattened parts 60. By this means the sliders 53 and 54 are brought into the position illustrated in Fig. 12 in which they press the ends of two adjacent match strips each against one another so that they are glued together.

When the glued part is dried the arm 62 of the bolt 56 is rotated back through 90° by the stop so that the sliders 53 and 54 are opened again. At the same time also the opposite slider 52 is opened so that the strips of matches are no longer held fast in the carrying ledge. They then come within reach of grippers 59 (Figs. 1 and 7) which act in the same manner as the grippers 16. These grippers are arranged on a gripper holder 63 which is moved backwards and forwards in guides 65 by means of a connecting rod 64, the grippers alternately opening and closing so that they pull the finished strips of matches out of the carrying ledges 50 and deposit them upon the endless band 66 running transversely to the machine and this band conveys them out of the machine.

If the match sticks 95 are cut very narrow it may easily happen that the match heads of adjacent matches stick together. This can be prevented by bending the match sticks 95 of the individual strips 94 in the carrying ledge 50 alternately away from one another so that the heads no longer lie side by side in one row, as shown in Fig. 32, but in a zigzag row (Fig. 33). This is rendered possible by the fact that the bars of the stationary grid plates 51 of the carrying ledges are provided with projections 102 (Figs. 30 and 31) and the bars of the sliding grid 52 with projections 103, staggered relatively to the first mentioned projections, which bend the adjacent sticks 95 of the strip 94 alternately to opposite sides, as illustrated in Fig. 30. The heads of the matches, owing to this zigzag arrangement are separated from one another by such a distance that the sticking together of the ignition material of adjacent heads is no longer to be feared.

I claim:

1. A machine for the automatic manufacture of strips of matches, a stamping cutter having a blade of zigzag formation for longitudinally cutting the pieces of material and spaced blades for cutting the strips transversely on opposite sides of the zigzag cutter so that the individual sticks on one side will be in staggered relation with the individual sticks on the other side of the zigzag cutter and displaced relation to said first mentioned sticks, a collecting comb, and means for arranging the cut strips in the collecting comb so that the halves of the strips formed by the zigzag cut are arranged in succession with the tips directed toward the same side and along one edge, means for shifting the collecting comb laterally, an endless transporting chain provided with holders, and means for transferring the half strips of matches to the holders on the endless transporting chain after each shifting of the collecting comb, said endless chain conveying the strips of matches along a path for a plurality of finishing operations.

2. A machine according to claim 1 characterized by the fact that the zigzag shaped blade is located to one side of the center line of the match strip so that the match heads of the two halves are at different distances from the tearing off edge.

3. A machine according to claim 1 and characterized by a strip pusher providing a support for the blanks during the cutting, grippers adapted to remove one half of the cut strip of matches and deposit the same in the collecting comb, means for rotating the strip pusher through 180° for presenting the second half of the strip with the tips disposed in the same direction as the first half of the strip to the gripper, means for moving the grippers opposite the second half of the strip, and means for causing the grippers to seize the second half of the strips and deposit the same in the collecting comb.

4. A machine for the automatic manufacture of strips of matches, a stamping cutter having a blade of zigzag formation for longitudinally cutting the pieces of material and spaced blades for cutting the strips transversely on opposite sides of the zigzag cutter so that the individual sticks on one side will be in staggered relation with the individual sticks on the other side of the zigzag cutter and displaced relation to said first mentioned sticks, a collecting comb, and means for arranging the cut strips in the collecting comb so that the halves of the strips formed by the zigzag cut are arranged in succession with the tips directed towards the same side and along one edge, means for shifting the collecting comb laterally, an endless transporting chain provided with holders, and means for transferring the half strips of matches to the holders on the endless transporting chain after each shifting of the collecting comb, said endless chain conveying the strips of matches along a path for a plurality of finishing operations, said means for arranging the strips in the combs comprising grippers, means for rotating the grippers through an arc of 90° so that said grippers will deposit the match strips on an edge and side by side in the collecting comb.

5. A machine according to claim 1 and characterized by a strip pusher providing a support for the blanks during the cutting, grippers adapted to remove one half of the cut strip of matches and deposit the same in the collecting comb, means for rotating the strip pusher through 180° for presenting the second half of the strip with the tips disposed in the same direction as the first half of the strip to the gripper, means for moving the grippers opposite the second half of the strip, and means for causing the grippers to seize the second half of the strips and deposit the same in the collecting comb, means for rotating the grippers through an arc of 90° so that said grippers will deposit the match strips on an edge and side by side in the collecting comb.

6. A machine for the automatic manufacture of strips of matches, a stamping cutter having a blade of zigzag formation for longitudinally cutting the pieces of material and spaced blades for cutting the strips transversely on opposite sides of the zigzag cutter so that the individual sticks on one side will be in staggered relation with the individual sticks on the other side of the zigzag cutter and displaced relation to said first mentioned sticks, a collecting comb, and means for arranging the cut strips in the collecting comb so that the halves of the strips formed by the zigzag cut are arranged in succession with the tips directed towards the same side and along one edge, means for shifting the collecting comb laterally, an endless transporting chain provided with holders, and means for transferring the half strips of matches to the holders on the endless transporting chain after each shifting of the collecting comb, said endless chain conveying the strips of matches along a path for a plurality of finishing operations, a thrust comb located at the rear of the collecting comb, a spring connected with the thrust comb, means for placing temporarily the spring under tension and releasing said spring to move the thrust comb towards the collecting comb, the spring continuing to move the thrust and collecting combs forwardly, and a stop for arresting the movement of the collecting comb while permitting continuing movement of the thrust comb, whereby the teeth of the thrust comb are forced between the teeth of the collecting comb to force the strips of matches out of the collecting comb, and a carrying ledge to receive the strips of matches.

7. A machine for the automatic manufacture of strips of matches, a stamping cutter having a blade of zigzag formation for longitudinally cutting the pieces of material and spaced blades for cutting the strips transversely on opposite sides of the zigzag cutter so that the individual sticks on one side will be in staggered relation with the individual sticks on the other side of the zigzag cutter and displaced relation to said first mentioned sticks, a collecting comb, and means for arranging the cut strips in the collecting comb so that the halves of the strips formed by the zigzag cut are arranged in succession with the tips directed towards the same side and along one edge, means for shifting the collecting comb laterally, an endless transporting chain provided with holders, and means for transferring the half strips of matches to the holders on the endless transporting chain after each shifting of the collecting comb, said endless chain conveying the strips of matches along a path for a plurality of finishing operations, a thrust comb located at the rear of the collecting comb, a spring connected with the thrust comb, means for placing temporarily the spring under tension and releasing said spring to move the thrust comb towards the collecting comb, the spring continuing to move the thrust and collecting combs forwardly, and a stop for arresting the movement of the collecting comb while continuing movement of the thrust comb, whereby the teeth of the thrust comb are forced between the teeth of the collecting comb to force the strips of matches out of the collecting comb, and carrying ledge to receive the strips of matches, said carrying ledge being provided with a pair of stationary grid plates and a sliding grid located between the stationary plates and having apertures to receive the individual matches, a spring for moving the sliding grid into engagement with the strips of matches for clamping the matches against the stationary grids.

8. A machine for the automatic manufacture of strips of matches, a stamping cutter having a blade of zigzag formation for longitudinally cutting the pieces of material and spaced blades for cutting the strips transversely on opposite sides of the zigzag cutter so that the individual sticks on one side will be in staggered relation with the individual sticks on the other side of the zigzag cutter and displaced relation to said first mentioned sticks, a collecting comb, and means for arranging the cut strips in the collecting comb so that the halves of the strips formed by the zigzag cut are arranged in succession with the tips directed towards the same side and along one edge, means for shifting the collecting comb laterally, an endless transporting chain provided with holders, and means for transferring the half strips of matches to the holders on the endless transporting chain after each shifting of the collecting comb, said endless chain conveying the strips of matches along a path for a plurality of finishing operations, a thrust comb located at the rear of the collecting comb, a spring connected with the thrust comb, means for placing temporarily the spring under tension and releasing said spring to move the thrust comb towards the collecting comb, the spring continuing to move the thrust and collecting combs forwardly, and a stop for arresting the movement of the collecting comb while continuing movement of the thrust comb, whereby the teeth of the thrust comb are forced between the teeth of the collecting comb to force the strips of matches out of the collecting comb, and carrying ledge to receive the strips of matches, said carrying ledge being provided with a pair of stationary grid plates and a sliding grid located between the stationary plates and having apertures to receive the individual matches, a spring for moving the sliding grid into engagement with the strips of matches for clamping the matches against the stationary grids, means for applying a cement to the ends of a pair of strips which is opposite to the tips and means for forcing the cemented ends into contact with each other.

In testimony whereof I have signed my name to this specification.

WILHELM HUHND.